United States Patent
Lloyd

(10) Patent No.: US 10,552,213 B2
(45) Date of Patent: Feb. 4, 2020

(54) THREAD POOL AND TASK QUEUING METHOD AND SYSTEM

(71) Applicant: Red Hat, Inc., Raleigh, NC (US)

(72) Inventor: David Lloyd, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 97 days.

(21) Appl. No.: 15/843,597

(22) Filed: Dec. 15, 2017

(65) Prior Publication Data

US 2019/0188034 A1 Jun. 20, 2019

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5038* (2013.01); *G06F 9/5055* (2013.01); *G06F 9/5061* (2013.01); *G06F 9/5083* (2013.01); *G06F 2209/5011* (2013.01)

(58) Field of Classification Search
CPC .... G06F 9/5044; G06F 9/505; G06F 16/2453; G06F 9/5061; G06F 9/5027; G06F 9/5038; G06F 9/5055; G06F 9/4881; G06F 9/5083; G06F 2209/5011; H04N 1/448
See application file for complete search history.

(56) References Cited

U.S. PATENT DOCUMENTS

| | | | |
|---|---|---|---|
| 6,895,584 B1 * | 5/2005 | Belkin | G06F 9/5027 718/100 |
| 7,249,355 B2 * | 7/2007 | O'Neill | G06F 9/5044 718/100 |
| 8,789,057 B2 | 7/2014 | Dice et al. | |
| 9,043,363 B2 | 5/2015 | Dragojevic et al. | |
| 9,459,876 B2 | 10/2016 | Giroux et al. | |
| 9,910,711 B1 * | 3/2018 | Ryoo | G06F 9/5061 |
| 2004/0139434 A1 * | 7/2004 | Blythe | G06F 9/505 718/100 |
| 2007/0104007 A1 * | 5/2007 | Mizuno | H04N 1/448 365/221 |
| 2010/0153957 A1 * | 6/2010 | Xu | G06F 9/505 718/102 |
| 2017/0061364 A1 * | 3/2017 | Waltz | G06F 16/2453 |

* cited by examiner

*Primary Examiner* — Tuan A Vu
(74) *Attorney, Agent, or Firm* — K&L Gates LLP

(57) ABSTRACT

A system includes a memory, at least one processor in communication with the memory, a counter, and a scheduler. The scheduler is configured to classify a thread of the pool of threads as a first classification as either available or unavailable. Additionally, the scheduler is configured to classify the pool of threads, based on a counter value from the counter, as a second classification less than a configured core thread pool size, equal to or larger than the configured core thread pool size but less than a maximum core thread pool size, or equal to or larger than the maximum core thread pool size. The scheduler is also configured to classify a resistance factor as a third classification as either within a limit or outside the limit, and schedule a work order based on at least one of the classifications.

20 Claims, 8 Drawing Sheets

THREAD POOL AND TASK QUEUING METHOD AND SYSTEM

BACKGROUND

Computer systems may routinely perform tasks and complete work orders. For example, processors may execute instructions to read, write, and copy memory entries, according to an assigned task or work order. Tasks may typically be added to a work queue and completed on a first-in-first-out ("FIFO") basis or a last-in-first-out ("LIFO") basis.

The processors may use threads to complete tasks or work orders. Physical resources, such as a hardware thread, may be associated with a processing core. For example, there may be a single hardware thread per core on a processor. When there are more software threads (e.g., threads created by an application or a program), an operating system may schedule the software threads.

A software thread, which may be referred to as a thread of execution (or simply a thread) is a software unit. In a multi-processor/multi-core system, multiple threads can be executed in parallel. That is, each of the processors or cores may execute a thread simultaneously. One thread can pass a request to another thread to cause the request to be executed.

SUMMARY

The present disclosure provides new and innovative systems and methods of thread pool and task queueing for work order scheduling. In an example, a system includes a memory, at least one processor in communication with the memory, a counter, and a scheduler. The scheduler is configured to classify a thread of the pool of threads as a first classification as one of available and unavailable. Additionally, the scheduler is configured to classify the pool of threads, based on a counter value from the counter, as a second classification as one of less than a configured core thread pool size, equal to or larger than the configured core thread pool size but less than a maximum core thread pool size, and equal to or larger than the maximum core thread pool size. The scheduler is also configured to classify a resistance factor as a third classification as one of within a limit and outside the limit, and schedule a work order based on at least one of the first, second, and third classifications.

In an example, a system includes a memory, at least one processor in communication with the memory, and a scheduler. The scheduler is configure to (i) determine a first status of a thread of a pool of threads as one of (a) available and (b) unavailable, and (1) responsive to (i)(a), schedule a work order to the thread, and (2) responsive to (i)(b), append the work order to a work queue. The scheduler is also configured to (ii) determine a second status of the pool of threads as one of (a) less than a configured core thread pool size, (b) larger than the configured core thread pool size but less than a maximum core thread pool size, and (c) equal to or larger than the maximum core thread pool size, and (1) responsive to (i)(b) and (ii)(a), create a new thread for the work order, and (2) responsive to (i)(b) and (ii)(b), determine a third status of the resistance factor as one of (a) within a limit and (b) outside the limit, and (A) responsive to (2)(a), create the new thread, and (B) responsive to (2)(b), enqueue the work order, and (3) responsive to (i)(b) and responsive to (ii)(c), enqueue the work order to the work queue.

In an example, a method includes classifying a thread of the pool of threads as a first classification as one of available and unavailable. Additionally, the method includes classifying the pool of threads as a second classification as one of less than a configured core thread pool size, larger than the configured core thread pool size but less than a maximum core thread pool size, and equal to or larger than the maximum core thread pool size. The method also includes classifying a resistance factor as a third classification as one of within a limit and outside the limit, classifying the thread of the pool of threads as a fourth classification as one of most recently idle and available and unavailable; and adding a work order to one of a thread or a work queue based on at least one of the first, second, and third classifications.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1A:
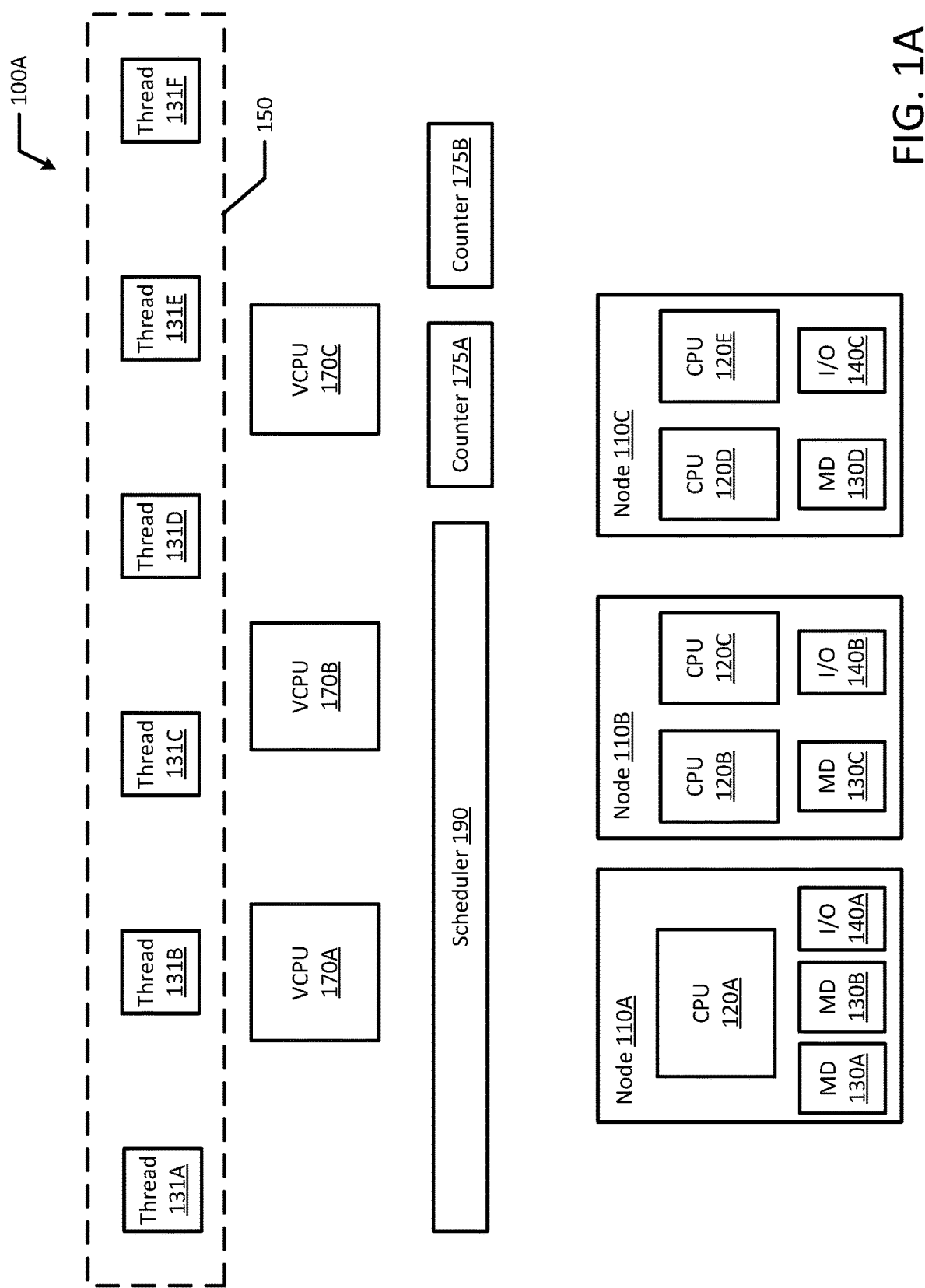
FIGS. 1A and 1B illustrate block diagrams of example computing systems according to example embodiments of the present disclosure.

Techniques are disclosed for work order scheduling with a thread pool and task queueing. For example, the disclosed systems and methods may be used to dispatch work in software, such as middleware that lies between an operating system (OS) and an application(s) running on the OS. An example middleware is JBoss® Enterprise Application Platform ("EAP"). Computer services (e.g., Java middleware services, Red Hat® JBoss® EAP) depend heavily on the dispatch of work (e.g., tasks or work orders) from one thread to another. Dispatching work from one thread to another is accomplished through the use of a thread pool. An interface may be provided to allow a user to dispatch units of work (e.g., work orders or tasks) to threads which are waiting to consume and execute the work in the thread pool.

Typically, computer systems implement strict FIFO queues or strict LIFO queues to manage work. In a strict FIFO or LIFO queue, threads are often selected by the OS scheduler (effectively at random) for work, and there is no guarantee that work will be distributed to the most recently busy idle thread, which jeopardizes the ability of the pool to properly expire threads. Additionally, new threads are created for every task until a pre-set "core" size is reached, after which tasks go into the work queue to wait for a working thread to complete a task. Once the work queue is full, new threads are created until a pre-set "maximum" size is reached. If the queue is unbounded, then the maximum size is never reached, and the thread pool is always filled to the "core" size, thereby preventing the expiration of threads.

These systems are inherently flawed because it is practically impossible to have an unbounded queue and desirable thread pool growth semantics. The effect of the systems described above is that generally, the thread pool must remain full to its maximum size at all times, even when the system is not receiving a high request load. However, having too many threads can bog down a system. For example, partitioning a fixed amount of work among too many threads gives each thread too little work, and the overhead associated with starting and terminating a thread exceeds that of the useful work performed. Additionally, having too many threads running incurs overhead associated with how the threads share finite hardware resources. A real physical resource such as a hardware thread, may be associated with a processing core. For example, there may be a single hardware thread per core on a processor. When there are more software threads (e.g., threads created by an application or a program), an operating system may schedule the software threads so that each software thread gets a turn to run on a hardware thread.

Typically, each software thread may be given a time slice or turn to run on a hardware thread. When the time slice runs out, the scheduler may suspend the thread and allow the next thread waiting its turn to run on the hardware thread. However, time slicing incurs overhead, for example, associating with saving a register state of a thread when suspending and/or restoring the thread as well as saving and/or restoring a thread's cache state. In some instances, a thread's cache state may be on the magnitude of megabytes. Further, when a cache is full, the processor generally evicts data from the cache to make room for new data, and software threads typically tend to evict each other's data, which can reduce system performance. Similarly, virtual memory associated with software threads (e.g., virtual memory for a thread's private data structures) may be evicted by other threads and may reduce system performance. In extreme cases, too many threads may cause a program to run out of virtual memory. In addition to the overhead of creating and destroying threads, active threads consume system resources and creating too many threads at once may cause the system to run out of memory or crash.

To optimize thread scheduling and improve system performance, the techniques disclosed advantageously provide a thread pool which can dynamically resize itself in response to additional workload, but which also prefers reusing existing threads over creating new threads, which advantageously biases the thread pool towards its optimized minimum size to reduce overhead. For example, "hot" threads or the most recently idle threads are reused thereby allowing older stagnant or "cold" threads to expire. Additionally, the techniques disclosed advantageously allow a user to specify flexible growth parameters for the thread pool, such that the thread pool grows normally to a point and then resists growth beyond that point. For example, when scheduling a task or a work order, a scheduler may perform several classifications to determine the availability of a thread in the thread pool, thread pool size, and whether a resistance factor is within a limit or not. Then, the scheduler may schedule the work order based on one or more of the above classifications. For example, if a thread is available, the scheduler may schedule the work order to the most recently available thread thereby increasing the likelihood that other idle threads expire to reduce the size of the thread pool. If the threads in the thread pool are busy or unavailable, the scheduler may determine whether the thread pool size has grown to beyond its configured core thread pool size. If the thread pool is below the configured size, the scheduler may advantageously create a new thread such that the work order is processed immediately. If the thread pool size is above the core size, the scheduler may review a resistance factor to determine if a new thread is created or if the work order gets added to a work queue. By using a resistance factor, the growth rate of the thread pool is advantageously controlled. For example, by providing additional resistance to growth, overhead associated with having too many threads running at once is advantageously reduced.

FIG. 1A depicts a high-level component diagram of an example computing system 100A in accordance with one or more aspects of the present disclosure. The computing system 100A may include a scheduler 190, virtual CPU's 170A-C, nodes (e.g., nodes 110A-C), and counters 175A-B.

For example, counters 175A-B may be incremented and decremented by scheduler 190. Additionally, counters 175A may be used to track a quantity of threads in a respective thread pool. Counter 175B may be used to track a quantity of work orders in a work queue. Scheduler 190 may check counter values on counters 175A-B when determining how to schedule a work order. For example, if counter 175A indicates there are too many threads in the thread pool 150, the work order may be added to a work queue. Additionally, when using a bounded work queue, the scheduler 190 may reject a work order if the work queue is full of work orders. In an example, counters 175A-B may be a part of memory (e.g., MD 130A-D). Additionally, counters 175A-B may be a register, for example, in a CPU (e.g., CPU 120A-E).

For example, a counter value of three ("3" or boolean 11) for counter 175A may indicate that there are three threads 131 in thread pool 150. The thread counter 175A may progressively count from 1 (boolean 01), to 2 (boolean 10), to 3 (boolean 11), to 2 as the thread pool increase from a single thread 131 to three threads 131, and then decreases to two threads 131. Alternatively, the counter value may count down from the maximum core thread pool size to indicate how many threads can be added to the thread pool 150 before reaching the maximum. For example, a counter value of three ("3" or boolean 11) may indicate that the thread pool 150 can hold an additional four threads 131 before reaching the maximum thread pool core size. As additional threads 131 are added up to the maximum core size the counter (e.g., counter 175A) may progressively count from 3 (boolean 11), to 2 (boolean 10), to 1 (boolean 01), to 0 (boolean 00), and the counter cannot count below zero so at 0 (00), so no more threads 131 may be added to the thread pool 150. As threads expire, the counter (e.g., counter 175) may increment the counter value.

Similarly, counter 175B may be incremented and/or decremented to track the quantity of work orders in a work queue. In an example, the counters 175A-B may be used to provide statistics to a user such that the user can monitor the system. The counter values along with the set resistance factors may be used to monitor how quickly a thread pool 150 and/or a work queue 182 are growing. Statistics may include the number of work orders or tasks submitted, the number of work orders or tasks completed, the number of work orders or tasks rejected, the number of threads 131 currently busy, the size of the thread pool 150, the size of the work queue 182, etc.

Virtual CPU's 170A-C may be running within virtual machines, which may include a guest OS, guest memory, virtual memory devices (VMD), and virtual input/output devices (VI/O). The virtual CPU's may execute tasks or work orders using threads 131A-F. For example, the computing system 100A may also include threads 131A-131F. Threads 131A-131F may form one or more thread pools 150. For example, Threads 131A-131C may be a thread pool while threads 131D-131F form a different thread pool. Additionally, as illustrated in FIG. 1A, threads 131A-131F may form a single thread pool 150. Threads 131A-F, such as software threads, may be created by programs or applications (e.g., applications within a virtual machine).

The computer system 100A may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual CPU's 170A-C may be provisioned on the same host or node (e.g., node 110A) or different nodes. For example, VCPU 170A and VCPU 170B may both be provisioned on node 110A. Alternatively, VCPU 170A may be provided on node 110A while VCPU 170B is provisioned on node 110B.

In an example, VCPU 170A-C may each be associated with its own respective physical processor (e.g., physical CPUs 120A-C of nodes 110A-B). In another example, virtual processors may be assigned to the same physical processor or CPU. Additionally, virtual processors may be assigned to different cores on the same physical processor.

Each virtual processor 170A-C may run one or more threads 131A-F. For example, VCPU 170A may run threads 131A-B, VCPU 190B may run thread 131C, and VCPU 170C may run threads 131D-F. A thread or ordered sequence of instructions may allow the virtual processors to execute multiple instruction streams simultaneously. For example, VCPU 170C may simultaneously run three instruction streams on threads 131D-F.

Figure 1B:
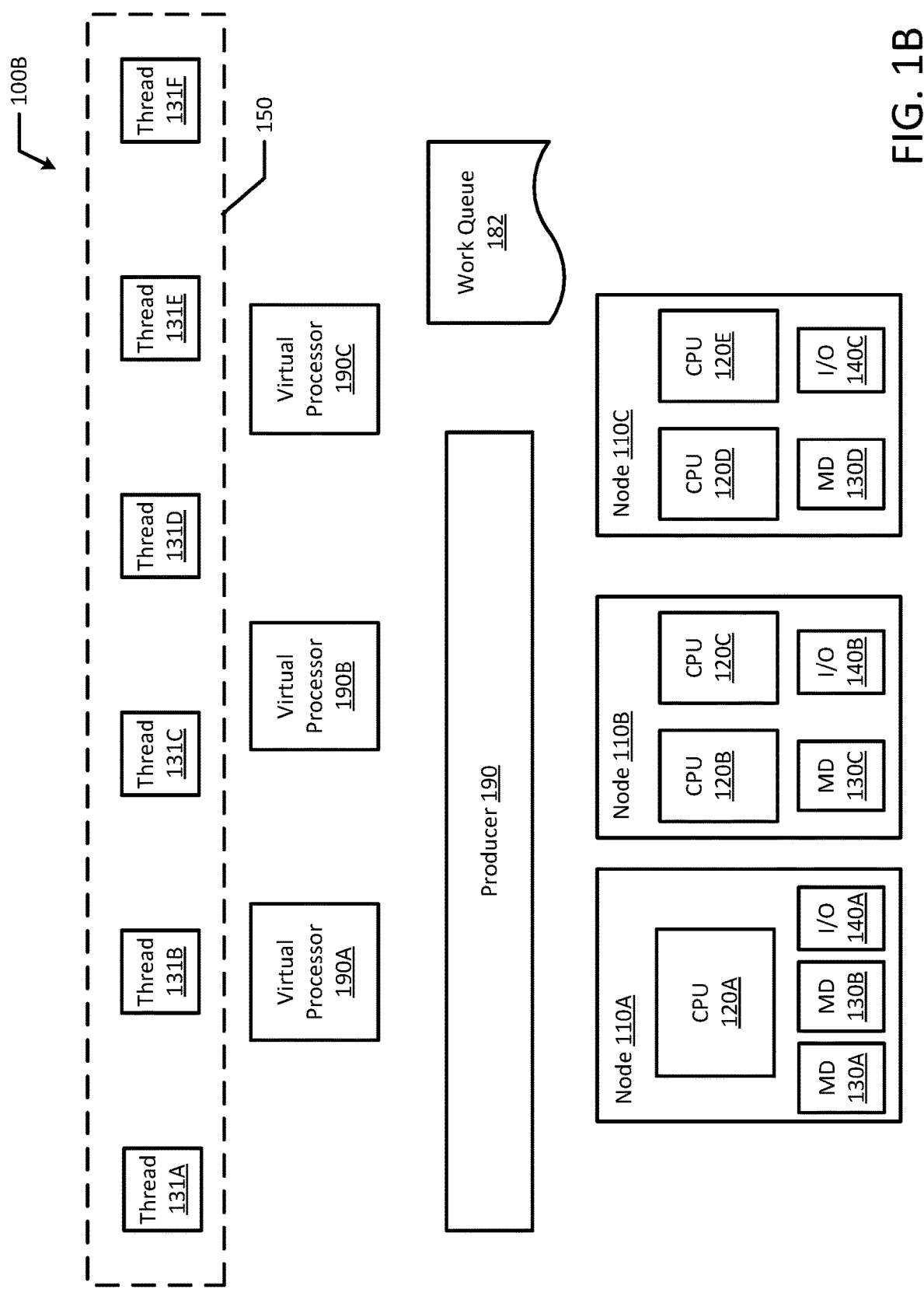

FIG. 1B depicts a high-level component diagram of an example computing system 100B in accordance with one or more aspects of the present disclosure. Computing system 100B may include one or more of the features discussed above in system 100A. Additionally, system 100B may include a work queue 182. Work queue 182 may be an unbounded work queue or a bounded work queue. The scheduler 190 may add items to the work queue 182 when the threads 131 in the thread pool 150 are unavailable. Additionally, work queue 182 may have a defined maximum size, for example, when using a bounded work queue 182.

As used herein, physical processor or processor 120A-C, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node, including the connections between a processor 120A-C and a memory device 130A-C may be provided by one or more local buses of suitable architecture, for example, peripheral component interconnect (PCI).

Figure 2:
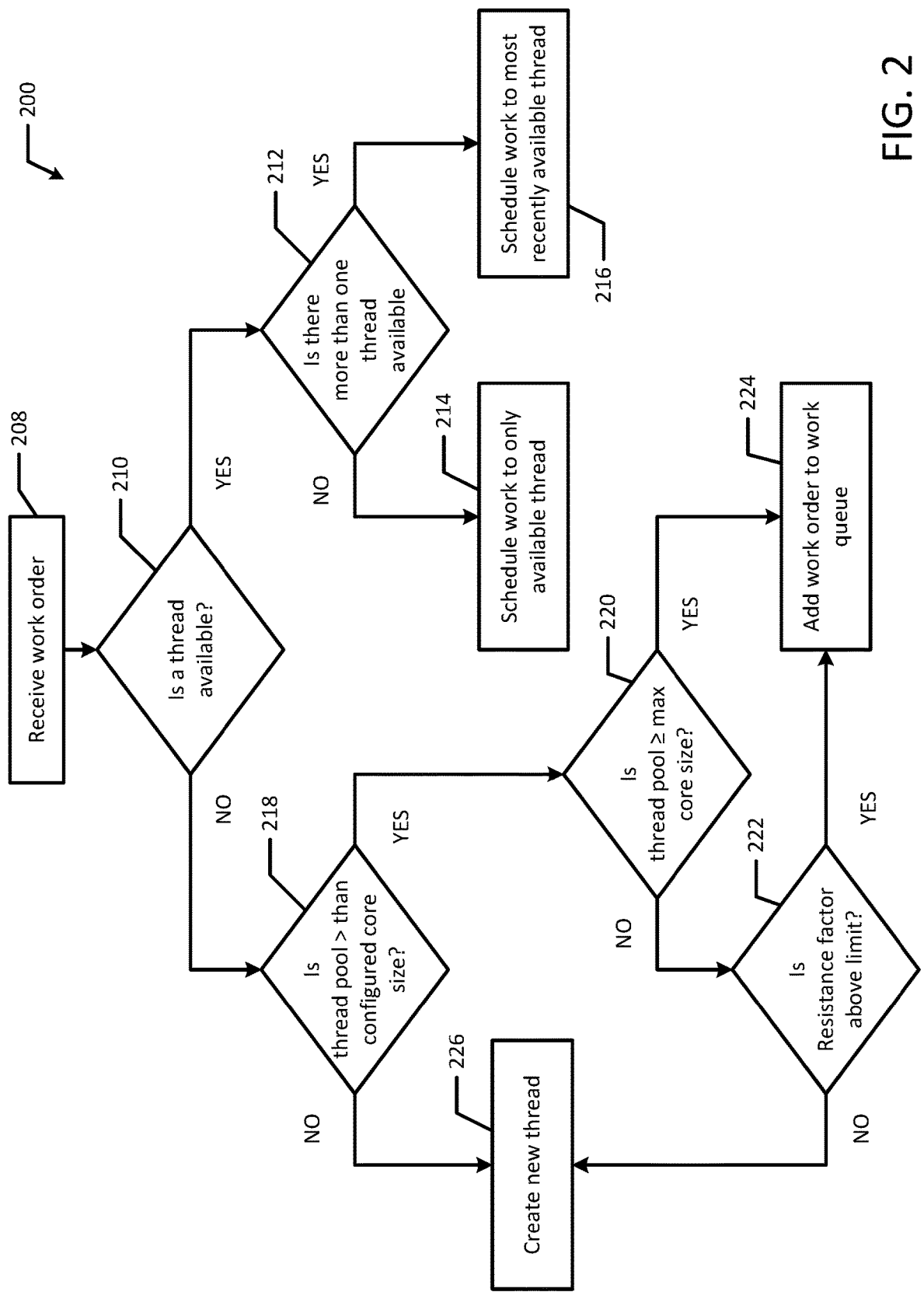
FIG. 2 illustrates a flowchart of an example process for work order scheduling with a thread pool and task queueing according to an example embodiment of the present disclosure.

FIG. 2 illustrates a flowchart for work order scheduling with a thread pool and task queueing. As illustrated in FIG. 2, a work order may be received (block 208). For example, a scheduler 190 may receive a work order from an application, a program, another thread, etc. Then, the method 200 includes determining if a thread is available (block 210). For example, the scheduler 190 may determine if there is an available (e.g., idle) thread 131 in the thread pool 150. For example, a thread 131 may be available if it has finished performing work, is currently idle, and has not expired yet. If a thread is available, the method 200 includes determining if there is more than one thread available (block 212). For example, the scheduler may identify each available thread 131 in the thread pool 150. If there is only one thread available, a work order may be scheduled to the available thread (block 214). For example, if a single thread (e.g., thread 131C) is available in thread pool 150, then the scheduler 190 may schedule the work order to thread 131C. However, if there is more than one thread available, the work order may be scheduled to the most recently available thread (block 216). For example, the scheduler 190 may schedule a work order to the most recently idle thread 131 when multiple threads are available. By scheduling the work order to the most recently available thread 131, older threads 131 are allowed to expire thereby advantageously reducing the overhead associated with running additional threads 131. By scheduling work to an available thread instead of creating a new thread for each work order, latency may be reduced by, for example, approximately 15%.

If a thread is unavailable (e.g., there are no idle threads in the thread pool), then method 200 includes determining whether the thread pool is larger than a configured core size (block 218). For example, a scheduler 190 may determine the thread pool size by referencing a counter value from a counter (e.g., counter 175A). In an example, the configured core thread pool size may be based on the bounds of available resources. In an example, the configured core thread pools size may be 500 threads 131. If the thread pool is larger than the configured core size, the method 200 includes determining if the thread pool is greater than or equal to the maximum core size (block 220). For example, the scheduler 190 may determine if the thread pool size is within the bounds of the specified maximum thread pool core size, or the maximum allowable size of the thread pool. In an example, the maximum core thread pool size may be 2000 threads 131. If the thread pool size is greater than or equal to the max core size, then the work order may be added to the work queue (block 224). For example, the scheduler 190 may add the work order to the work queue 182 if the thread pool is already at its maximum size (e.g., 2000 threads). If the thread pool size is less than the max core size, method 200 includes determining whether a resistance factor is above a limit (block 222). For example, the scheduler 190 may determine a resistance factor and compare it to an established threshold or limit. In an example, the resistance factor may be randomly generated, for example, by a random number generator ("RNG"), a pseudorandom number generator ("PRNG"), a hashing function, or a combination thereof. For example, a resistance factor may be a random value between zero and one. The threshold value may indicate the level of resistance of the system. For example, the scheduler 190 may create new threads as long as the resistance factor is below the threshold. To provide additional resistance, a threshold of 0.3 may be set which indicates that any resistance factor above 0.3 will be added to the work queue instead of creating a new thread. To reduce the resistance of the system, a larger threshold value may be used (e.g., 0.7, 0.8, 0.9). Alternatively, the scheduler 190 may create a new thread as long as the resistance factor is above the limit or threshold and add the work order to the work queue if the resistance factor is within the limit or threshold. If the resistance factor is above the limit, then the work order may be added to the work queue as previously described in block 224. If the resistance factor is within the limit, then a new thread may be created (block 226). For example, the scheduler 190 may create a new thread 131 if the resistance factor is within the established threshold or limit. Similarly, if the thread pool size is less than the configured core size as determined at block 218, the new thread may be created at block 226.

A thread 131 may expire after a predetermined amount of time (e.g., set by a timer), for example, after the thread stops working (e.g., completes a task or work order). For example, after completing a task, a thread 131 may refresh its "time to live" such that the thread 131 lives for another predetermined amount of time (e.g., 2 seconds, 5 seconds, 15 seconds, 1 minute). While the thread 131 is idle and alive, the thread may perform additional tasks and work orders, which reduces the overhead associated with creating new threads. Threads 131 may also expire based on the number or quantity of idle threads 131 in thread pool 150. For example, a user may set a limit to the quantity of idle threads 131 that may be idle at a given time (e.g., 4 idle threads, 10 idle threads, 25 idle threads). In an example where the limit is set to ten idle threads 131, after an eleventh thread becomes idle, the scheduler 190 may retire the oldest or most stagnant thread 131 to remain within the established limit.

In an example, thread expiration parameters may be set by a user. Additionally, thread expiration may be related to the limit or threshold established for the resistance factor. For example, in volatile work flows, a user may want the system to dynamically adjust in size quickly to adapt to unexpected increases or decreases in traffic, and the system may be configured so the thread pool grows quickly (e.g., low growth resistance established by limit or threshold compared to resistance factor) and dies quickly (e.g., short "time to live" or low limit of idle threads). By configuring the thread pool 150 to grow and die quickly, the system can handle unexpected increases workflow without suffering prolonged negative effects of having too many threads 131 in a thread pool 150. Additionally, the system may be configured for any combination of growing slowly, moderately, and quickly along with dying slowly, moderately, and quickly.

In an example, if a user wanted to create new threads 131 for 70 percent of work orders after reaching the configured core thread pool size, the scheduler 190 may be configured to create new threads for the first three work orders and add the next seven work orders to the work queue 182. However, the scheduler 190 may not know if or when ten work orders will be requested. Additionally, the scheduler 190 may not know if other threads will become idle between receiving the fourth work order and the tenth work order. The resistance factors may advantageously be generated for each work order by the scheduler 190 or by the thread 131 submitting the work order, which advantageously allows the scheduler 190 to schedule work orders without knowing information about previous and/or future work orders. For example, a threshold or limit may be established such that the scheduler 190 effectively creates new threads 131 for approximately 70 percent of new work orders without the scheduler 190 having to track information about previous work orders, status of threads 131 in the thread pool 150, etc., which results in more efficient use of hardware.

Figure 3:
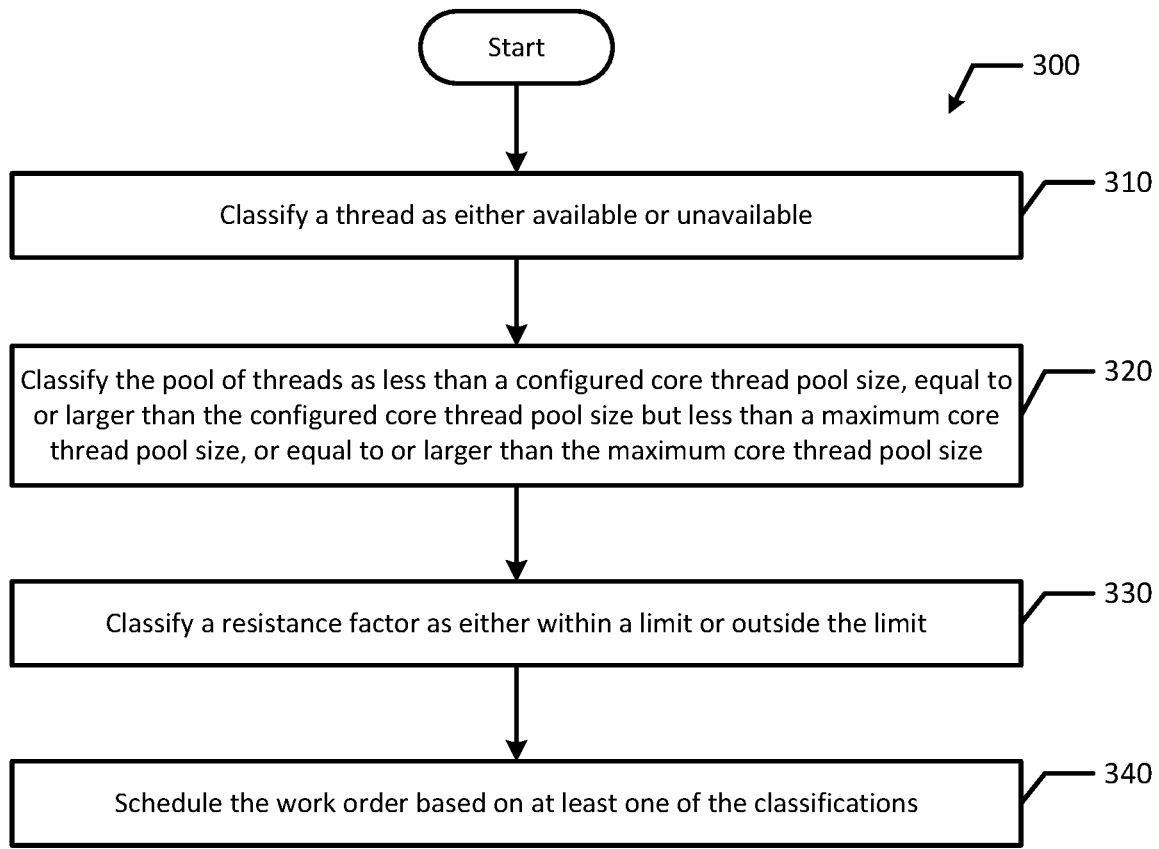
FIG. 3 illustrates a flowchart of an example process for work order scheduling with a thread pool and task queueing according to an example embodiment of the present disclosure.

FIG. 3 illustrates a flowchart of an example method 300 for work order scheduling with a thread pool and task queueing according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes classifying a thread as either available or unavailable (block 310). For example, a scheduler 190 may classify a thread 131 of a pool of threads 150 as a first classification as either available or unavailable. For example, thread 131 may be available if it is idle and not working. Additionally, a thread may be unavailable if it is busy performing work, such as a work order. Then, the method 300 includes classifying the pool of threads as less than a configured core thread pool size, equal to or larger than the configured core thread pool size but less than a maximum core thread pool size, or equal to or larger than the maximum core thread pool size (block 320). For example, a scheduler 190 may classify the pool of threads 150 based on a counter value from a counter (e.g., counter 175A). The scheduler 190 may classify the pool of threads as a second classification as one of less than a configured core thread pool size (e.g., 50 threads), equal to or larger than the configured core thread pool size but less than a maximum core thread pool size (e.g., 400 threads), and equal to or larger than the maximum core thread pool size (e.g., 400 threads). In an example, the counter (e.g., counter 175A) may track the current size of the thread pool 150. For example, the counter 175A may be incremented each time a thread is added to the thread pool 150 and decremented each time a thread expires and is removed from the thread pool 150. The configured core thread pool size and the maximum core thread pool size may be based on system resources as well as work environment. For example, the thread pool 150 may be limited to 100 threads. In another example, a server may have a thread pool 150 of thousands of threads.

Next, the method 300 includes classifying a resistance factor as either within a limit or outside the limit (block 330).

For example, the scheduler 190 may classify a resistance factor as a third classification as one of within a limit and outside the limit. In an example, within a limit may include the limit (e.g., both 0.79 and 0.80 are within the limit of 0.80). In another example, within the limit may be any number or quantity less than the specified limit (e.g., 0.79 is within the limit of 0.80, but 0.80 is outside the limit of 0.80). In an example, the resistance factor may be randomly generated, for example, by a random number generator (RNG), a pseudorandom number generator (PRNG), a hashing function, or a combination thereof. By using a resistance factor, the growth rate of the thread pool 150 may be reduced to control the size of the thread pool 150 to reduce overhead. Additionally, by slowing the growth of the thread pool 150, threads 131 are advantageously reused more often to reduce latency and improve system performance.

Then, the method 300 includes scheduling the work order based on at least one of the classifications (block 340). For example, the scheduler 190 may schedule the work order based on the first classification, the second classification, and/or the third classification. The scheduler 190 may schedule the work order based on any combination of the first classification, second classification, and third classification. Based on the classifications, the scheduler 190 may schedule the work order to a thread in the thread pool. Additionally, the scheduler 190 may add the work order to a work queue.

In another example, the method may also include determining whether the available thread is the only available thread. If the thread is the only available thread, the scheduler 190 may schedule the work order to the available thread. However, if there are multiple available threads, the scheduler may schedule the work order to the most recently available thread. By scheduling work orders or tasks to the most recently idle threads 131, the threads that have been idle the longest are allowed to expire, which advantageously optimizes the size of the thread pool. As each thread expires, the resources consumed by the expired thread are available to other system processes and tasks.

In another example, the method may include classifying a work queue as below a maximum size or equal to the maximum size. With bounded work queues, the scheduler 190 may reject a work order instead of adding the work order to the work queue if the work queue is at the maximum size. With unbounded work queues, the size of the work queue may increase as needed to accommodate additional work orders in the work queue.

Figure 4A:
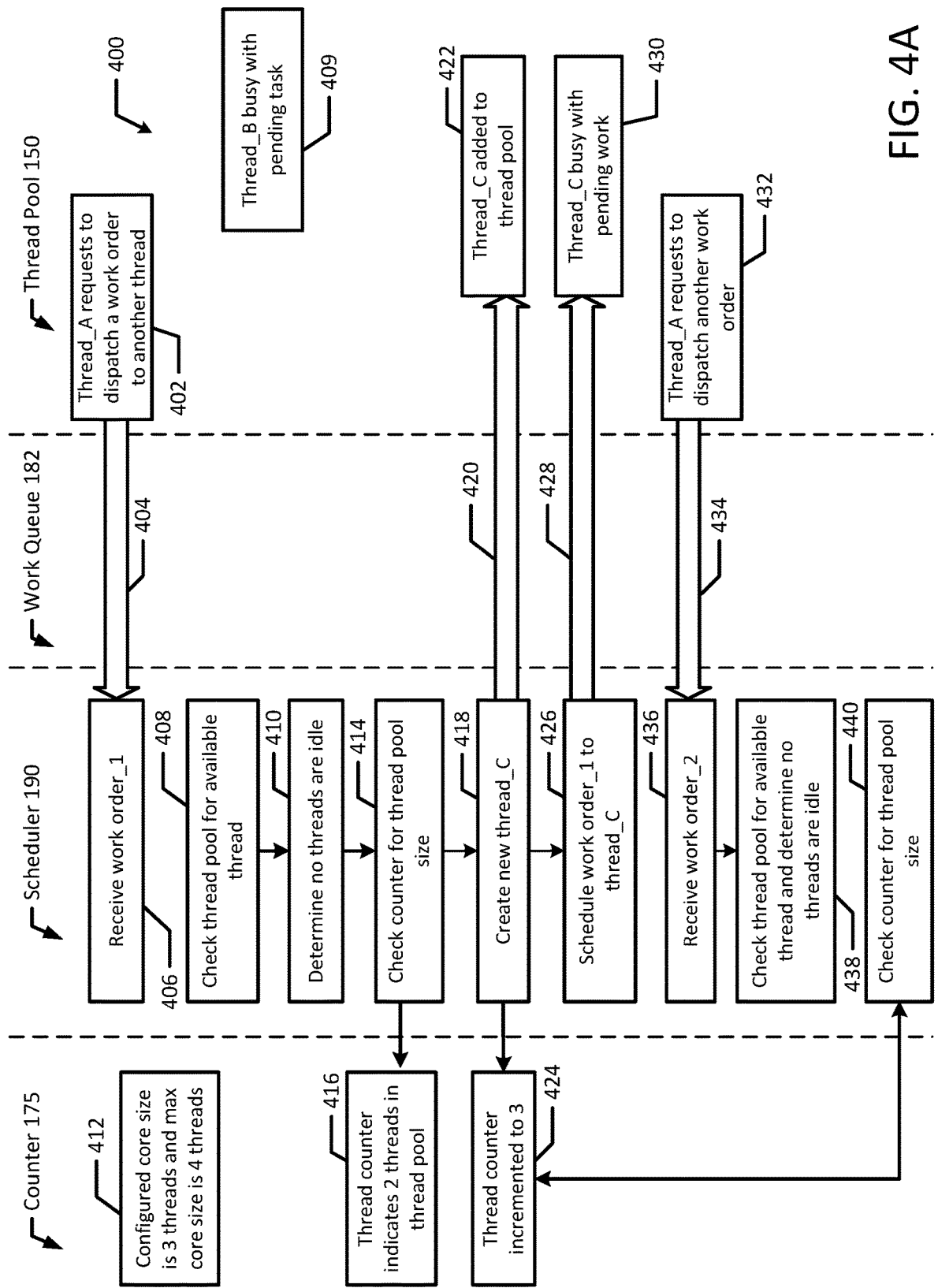
FIGS. 4A, 4B, and 4C illustrate a flow diagram of an example process for work order scheduling with a thread pool and task queueing according to an example embodiment of the present disclosure.
Figure 4B:
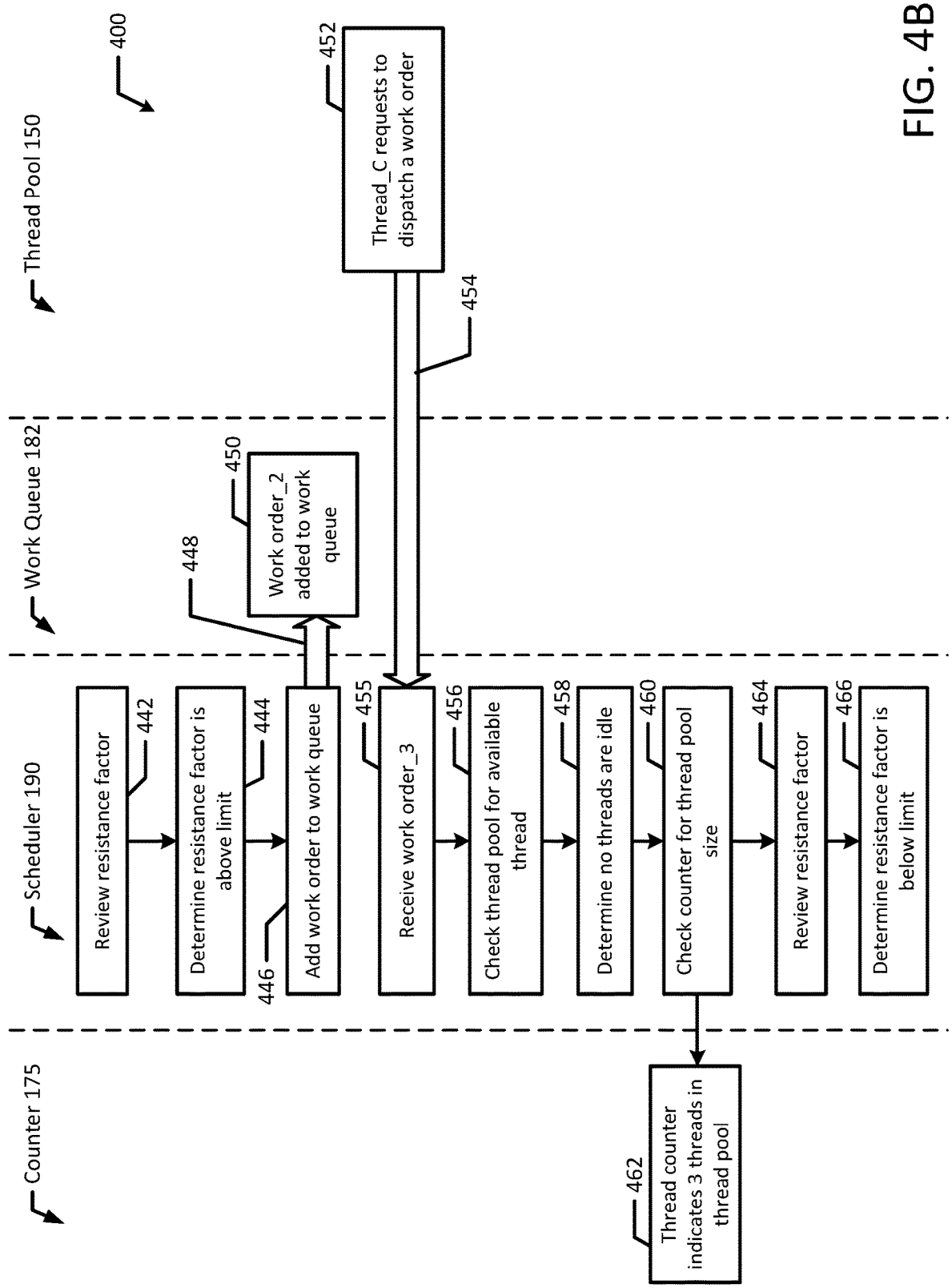
Figure 4C:
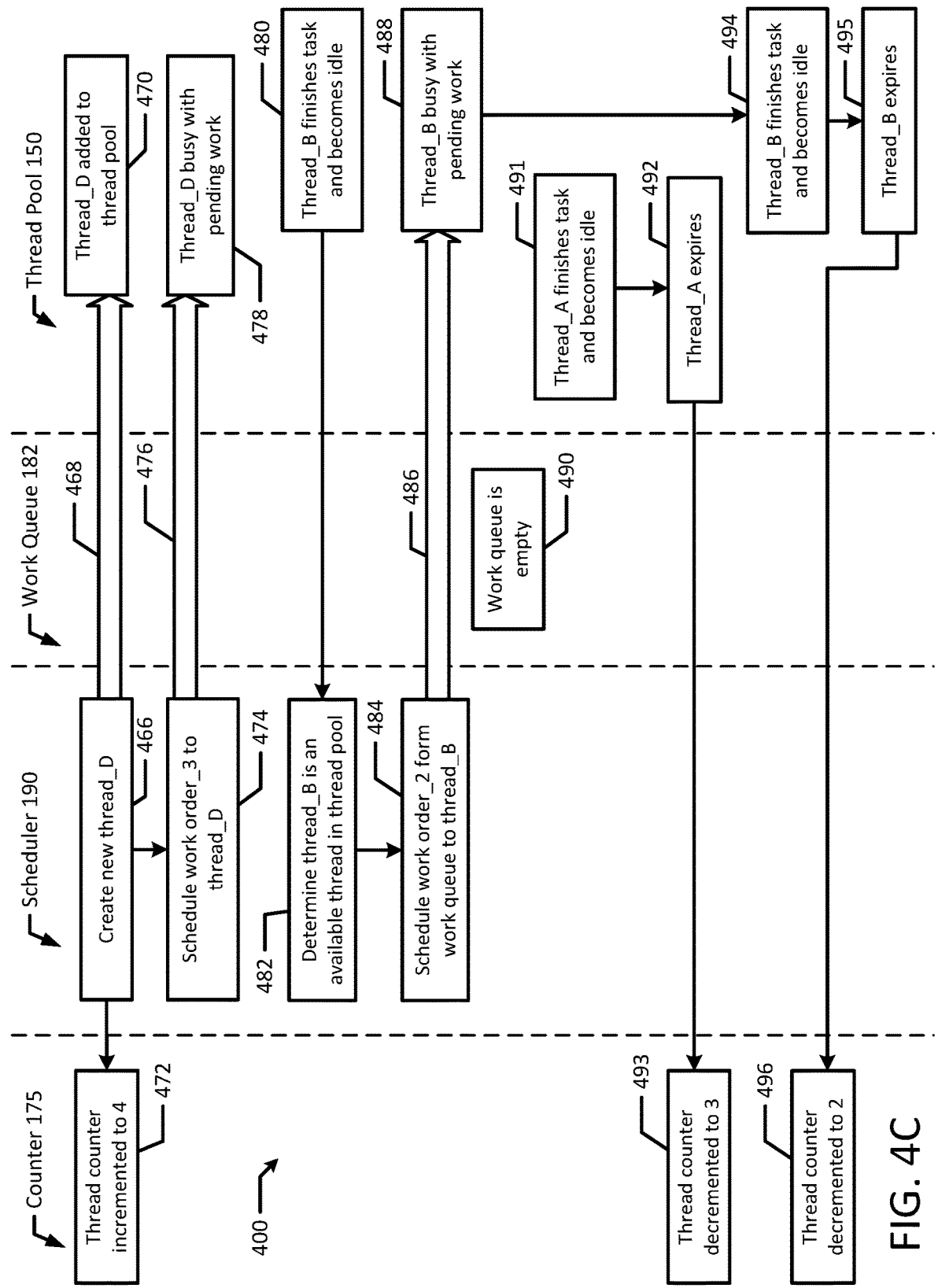

FIGS. 4A, 4B, and 4C illustrate a flowchart of an example method 400 for work order scheduling with a thread pool and task queueing in accordance with an example embodiment of the present disclosure. Although the example method 400 is described with reference to the flowchart illustrated in FIGS. 4A, 4B, and 4C, it will be appreciated that many other methods of performing the acts associated with the method 400 may be used. For example, the order of some of the blocks may be changed, certain blocks may be combined with other blocks, and some of the blocks described are optional. For example, a scheduler may communicate with a counter 175, a work queue 182, and a thread pool 150 to perform example method 400.

In the illustrated example, a thread (e.g., thread_A) of thread pool 150 requests to dispatch a work order to another thread 131 in the thread pool 150 (blocks 402 and 404). For example, thread_A may dispatch a work order to the thread pool 150 so that it can continue working on a different task (e.g., a real-time task, housekeeping task, user task). Then, the scheduler 190 receives the work order (e.g., work order_1) (block 406). For example, thread_A may send the work order to the scheduler 190. In another example, the work order may be sent to a work queue 182 where the scheduler 190 reviews the work order. After receiving the work order, the scheduler 190 checks the thread pool 150 for an available thread (block 408). For example, the scheduler 190 may review the entire thread pool 150 for idle threads. In another example, the scheduler 190 may check the work queue 182 for idle threads 131. For example, an idle thread 131 may indicate its availability in the work queue 182 by inserting in the next available slot that a head pointer will advance to when a new task is assigned. For example, information about the idle threads may be in an ordered list that indicates which thread 131 is the most recently ide. In the illustrated example, thread_B is busy with a pending task (block 409). The thread pool 150 includes thread_A and thread_B, both of which are busy when the scheduler checks the thread pool 150 for an available thread at block 408. Then, the scheduler 190 determines that none of the threads are idle (block 410). For example, the work queue 182 may not have any indications of an idle thread, and the scheduler 190 may proceed to determine if a new thread 131 should be added.

In the illustrated example, the configured core size is three threads and the maximum core size is four threads (block 412). For example, the configured core size may indicate a size that the thread pool 150 may grow to without resistance. Additionally, the maximum core size may limit the size that the thread pool 150 grows to. For example, the maximum core size may be set to prevent the thread pool 150 from becoming too large and reducing system performance. Then, the scheduler 190 checks counter 175 for the thread pool size (block 414). In an example, the scheduler 190 checks the thread pool size from a counter value of the counter 175, which indicates the number of threads 131 in the thread pool 150. The thread counter indicates that there are two threads 131 (e.g., thread_A and thread_B) in the thread pool 150 (block 416). For example, a counter value of three ("2" or boolean 10) may indicate that there are two threads 131 in thread pool 150.

Since the thread pool 150 is below the configured core size, the scheduler 190 creates a new thread (e.g., thread_C) (blocks 418 and 420). For example, the scheduler may create a new thread 131 to add to the thread pool 150, so that the work order can be performed immediately. Once created, the new thread 131 (e.g., thread_C) is added to the thread pool 150 (block 422). Additionally, the thread counter 175 is incremented to three (block 424). For example, now that the thread pool 150 has three threads (e.g., thread_A, thread_B, and thread_C), the thread counter 175 is incremented from two to three.

After creating the new thread 131 (e.g., thread_C), the scheduler 190 schedules work order_1 to thread_C (blocks 426 and 428). By scheduling the work order to thread_C immediately, the threads 131 in thread pool 150 are kept busy thereby maximizing system performance. Thread_C receives the work order and is now busy with pending work (block 430).

In the illustrated example, thread_A may request to dispatch another work order (blocks 432 and 434). For example, thread_A may dispatch another work order so that thread_A can submit work to another thread in the thread pool 150 so that thread_A can continue working on something else while the submitted work order or task runs in the background relative to thread_A. Then, the scheduler 190 receives work order_2 (block 436).

After receiving the work order, the scheduler 190 checks the thread pool 150 for an available thread and determines that none of the threads are idle (block 438). As discussed above, the scheduler may determine if threads 131 are available by checking the work queue 182 for indications of idle threads 131. Additionally, the scheduler 190 checks counter 175 for the thread pool size (block 440). For example, the thread pool size may dictate whether the scheduler 190 adds the work order to the work queue 182 or creates a new thread 131 for the work order.

Continuing on FIG. 4B, the scheduler 190 reviews the resistance factor (block 442). For example, the resistance factor may be 0.5 while the established limit or threshold is 0.3. The threshold or limit may be adjusted by a user such that the user can advantageously adjust the growth rate of the system. Then, the scheduler 190 determines that the resistance factor is above or outside the limit (block 444). For example, the scheduler 190 determines that the resistance factor of 0.5 is above the limit of 0.3 established for the system. Then, the scheduler 190 adds the work order (e.g., work order_2) to the work queue 182 (blocks 446 and 448). In an example, the work order may be added to the work queue 182 using a FIFO strategy or a LIFO strategy. Then, work order_2 is added to the work queue 182 (block 450). Work order_2 may sit in the work queue 182 until a thread is available to perform the work.

In the illustrated example, thread_C requests to dispatch a work order to the thread pool (blocks 452 and 454). Then, the scheduler 190 receives the work order (e.g., work order_3) (block 455). After receiving the work order, the scheduler 190 checks the thread pool 150 for an available thread (block 456). In the illustrated example, thread_A, thread_B, and thread_C are still busy with work. Then, the scheduler 190 determines that none of the threads are idle (block 458). As discussed above, the scheduler may determine if threads 131 are available by checking the work queue 182 for indications of idle threads 131. Then, the scheduler 190 checks counter 175 for the thread pool size (block 460). In the illustrated example, the thread counter 175 indicates that three threads are in the thread pool (block 462). For example, a counter value of three ("3" or boolean 11) may indicate that there are three threads 131 in thread pool 150.

Additionally, the scheduler 190 reviews the resistance factor (block 464). In an example, the scheduler may generate the resistance factor. In another example, the resistance factor may be appended to the work order. For example, thread_C may generate a resistance factor and append it to the work order before dispatching the work order at block 452. By allowing each thread 131 to generate or calculate resistance factors for work orders, the scheduler 190 may schedule work orders according to growth limits set by a user. Then, the scheduler 190 determines that the resistance factor is below or within the limit (block 466). For example, the resistance factor associated with work order_3 may be 0.2 while the established limit or threshold is 0.3, and thus the scheduler 190 determines that the resistance factor of 0.2 is below the established limit or threshold of 0.3.

Continuing on FIG. 4C, the scheduler creates a new thread (e.g., thread_D) based on the resistance factor comparison (blocks 466 and 468). Then, thread_D is added to the thread pool 150 (block 470). In an example, the scheduler 190 may immediately add the newly created thread 131 to the thread pool 150. In another example, the newly created thread 131 may be added to the thread pool 150 after a predetermined waiting period. Once thread_D is added to the thread pool 150, the thread counter 175 is incremented to 4 (block 472). In an example, the thread counter 175 may be incremented before the thread 131 is added to the thread pool. The scheduler 190 schedules work order_3 to thread_D (blocks 474 and 476). In an example, thread_D may be added to the thread pool 150 with the assigned task or work order. Then, thread_D is busy with pending work (e.g., work associated with work order_3) (block 478).

After some time, thread_B finishes its task and becomes idle (block 480). For example, thread_B may have finished its work that it was busy with in block 409 of FIG. 4A. After a thread_B becomes idle, scheduler 190 determines that thread_B is an available thread in the thread pool 150 (block 482). For example, thread_B may indicate that it is available in the work queue 182. Then, scheduler 190 schedules work order_2 from the work queue to thread_B (blocks 484 and 486). Once again, thread_B is busy with pending work (e.g., work associated with work order_2) (block 488).

The work queue 182 is empty (block 490). For example, work orders in the work queue may be scheduled to the next available thread 131. If multiple threads become available in a short span, the scheduler 190 may schedule the work order from the work queue to the most recently idle thread 131.

Then, thread_A finishes its task and becomes idle (block 491). After some time, thread_A expires (block 492). In an example, a thread 131 may expire after a predetermined amount of time (e.g., set by a timer) after the thread stops working (e.g., completes a task or work order). For example, after completing a task, a thread 131 may refresh its "time to live" such that the thread 131 lives for another predetermined amount of time (e.g., 2 seconds, 5 seconds, 15 seconds, 1 minute). In an example, the "time to live" may refresh each time the thread 131 completes a task and/or is assigned a task before the previous "time to live" expires. For example, a thread 131 may live far beyond an earlier "time to live". While the thread 131 is idle and alive, the thread may perform additional tasks and work orders, which reduces the overhead associated with creating new threads. Threads 131 may also expire based on the number or quantity of idle threads 131 in thread pool 150. For example, a user may set a limit to the quantity of idle threads 131 that may be idle at a given time (e.g., 4 idle threads, 10 idle threads, 25 idle threads). In an example where the limit is set to ten idle threads 131, after an eleventh thread becomes idle, the scheduler 190 may retire the oldest or most stagnant thread 131 to remain within the established limit.

After the expiration of thread_A, the thread counter 175 is decremented to 3 (block 493). For example, after thread_A expires, the thread pool 150 includes thread_B, thread_C, and thread_D. Next, thread_B finishes its task and becomes idle (block 494). Later, thread_B expires (block 495). By allowing threads to expire, the thread pool 150 advantageously reduces overhead associated with having too many threads, which reduces memory usage and improves system performance and hardware utilization not previously performable. Then, the thread counter 175 is decremented to 2 to indicate that two threads remain in the thread pool 150 (block 496).

The systems and methods disclosed herein are inextricably tied to and provide improvements to computer technology. Additionally, the solution described herein is necessarily rooted in computer technology to overcome a problem specifically arising in the realm of computer hardware utilization, and more specifically to thread pooling, by addressing the challenge of dispatching work in a thread pool to improve performance while minimizing overhead. The scheduler 190 manages work orders and threads 131 in thread pool 150 to efficiently schedule work orders while controlling the growth of the thread pool 150. Thus, system performance and hardware utilization is improved for work order submission systems by controlling the thread pool 150 and reducing memory eviction between threads and preventing the system from crashing due to excess thread overhead.

Figure 5:
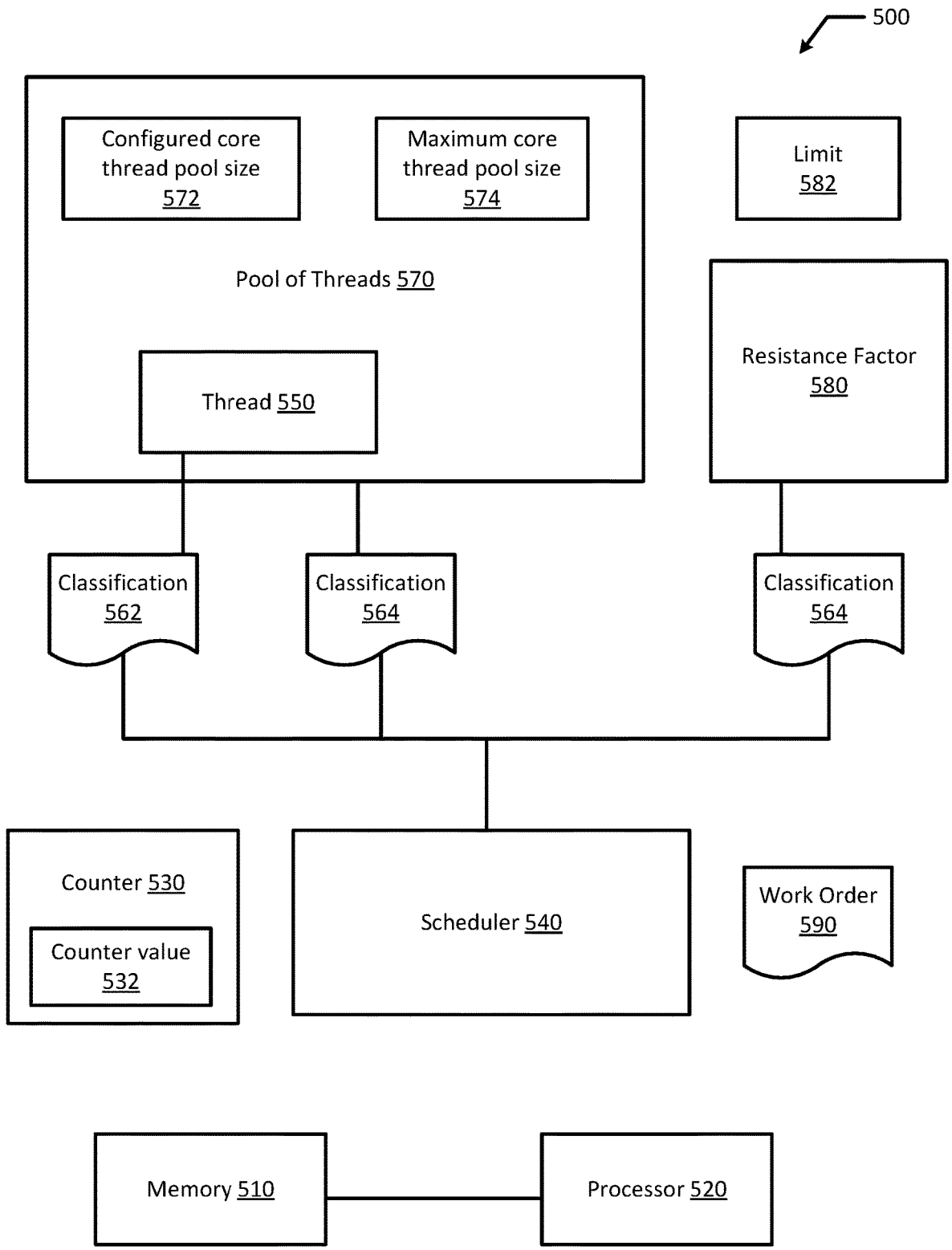
FIG. 5 illustrates a block diagram of an example work order scheduling system according to an example embodiment of the present disclosure.

FIG. 5 is a block diagram of an example work order scheduling system 500 according to an example embodiment of the present disclosure. The reverse order submission system 500 includes a memory 510, a processor 520 in communication with the memory 510, a counter 530, and a scheduler 540. The scheduler 540 may be configured to classify a thread 550 of a pool of threads 570 as a first classification 562 as either available or unavailable. Additionally, the scheduler 540 may be configured to classify the pool of threads 570, based on a counter value 532 from the counter 532, as a second classification 564. The second classification 564 is less than a configured core thread pool size 572, equal to or larger than the configured core thread pool size 572 but less than a maximum core thread pool size 574, and equal to or larger than the maximum core thread pool size 574. The scheduler 540 may be configured to classify a resistance factor 580 as a third classification 564 as one of within a limit 582 and outside the limit 582. Additionally, the scheduler 540 may be configured to schedule the work 590 order based on one ore more of the first classification 562, the second classification 564, and the third classification 566.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a memory, at least one processor in communication with the memory, a counter, and a scheduler. The scheduler is configured to classify a thread of a pool of threads as a first classification as one of available and unavailable. Additionally, the scheduler is configured to classify the pool of threads, based on a counter value from the counter, as a second classification as one of less than a configured core thread pool size, equal to or larger than the configured core thread pool size but less than a maximum core thread pool size, and equal to or larger than the maximum core thread pool size. The scheduler is also configured to classify a resistance factor as a third classification as one of within a limit and outside the limit, and schedule a work order based on at least one of the first, second, and third classifications.

In accordance with a 2nd exemplary aspect of the present disclosure, which may be used in combination with any one or more of the preceding aspects (e.g., the 1st aspect), the resistance factor is generated from at least one of a random number generator (RNG), a pseudorandom number generator (PRNG), and a hashing function.

In accordance with a 3rd exemplary aspect of the present disclosure, which may be used in combination with any one or more of the preceding aspects (e.g., the 1st aspect), the scheduler is configured to schedule a different work order responsive to classifying the thread of the pool of threads as available.

In accordance with a 4th exemplary aspect of the present disclosure, which may be used in combination with any one or more of the preceding aspects (e.g., the 1st aspect), the scheduler is configured to add the work order to a work queue.

In accordance with a 5th exemplary aspect of the present disclosure, which may be used in combination with any one or more of the preceding aspects (e.g., the 1st aspect), the scheduler is configured to create a new thread responsive to classifying the pool of threads as less than the configured core thread pool size, and schedule the work order to the new thread.

In accordance with a 6th exemplary aspect of the present disclosure, which may be used in combination with any one or more of the preceding aspects (e.g., the 1st aspect), the scheduler is configured to classify the resistance factor responsive to classifying the pool of threads as larger than the configured core thread pool size but less than the maximum core thread pool size.

In accordance with a 7th exemplary aspect of the present disclosure, which may be used in combination with any one or more of the preceding aspects (e.g., the 1st aspect), the scheduler is configured to add the work order to a work queue responsive to classifying the pool of threads as equal to or larger than the maximum core thread pool size.

In accordance with an 8th exemplary aspect of the present disclosure, which may be used in combination with any one or more of the preceding aspects (e.g., the 1st aspect), the scheduler is configured to add the work order to a work queue responsive to classifying the resistance factor as outside the limit.

In accordance with a 9th exemplary aspect of the present disclosure, which may be used in combination with any one or more of the preceding aspects (e.g., the 1st aspect), the scheduler is configured to add a new thread responsive to classifying the resistance factor as within the limit.

In accordance with a 10th exemplary aspect of the present disclosure, which may be used in combination with any one or more of the preceding aspects (e.g., the 1st aspect), the counter is configured to count a quantity of threads in the pool of threads.

In accordance with an 11th exemplary aspect of the present disclosure, which may be used in combination with any one or more of the preceding aspects (e.g., the 1st aspect), the system further includes a second counter configured to count a second quantity of work orders in a work queue.

In accordance with a 12th exemplary aspect of the present disclosure, which may be used in combination with any one or more of the preceding aspects (e.g., the 11th aspect), the work queue is an unbounded work queue.

In accordance with a 13th exemplary aspect of the present disclosure, which may be used in combination with any one or more of the preceding aspects (e.g., the 11th aspect), the work queue is a bounded work queue.

In accordance with a 14th exemplary aspect of the present disclosure, which may be used in combination with any one or more of the preceding aspects (e.g., the 1st aspect), the scheduler is configured to determine whether the thread was more recently made idle than another available thread.

Aspects of the subject matter described herein may be useful alone or in combination with one or more other aspects described herein. In a 15th exemplary aspect of the present disclosure a system includes a memory, at least one processor in communication with the memory, and a scheduler. The scheduler is configure to (i) determine a first status of a thread of a pool of threads as one of (a) available and (b) unavailable, and (1) responsive to (i)(a), schedule a work order to the thread, and (2) responsive to (i)(b), append the work order to a work queue. The scheduler is also configured to (ii) determine a second status of the pool of threads as one of (a) less than a configured core thread pool size, (b) larger than the configured core thread pool size but less than a maximum core thread pool size, and (c) equal to or larger than the maximum core thread pool size, and (1) responsive to (i)(b) and (ii)(a), create a new thread for the work order, and (2) responsive to (i)(b) and (ii)(b), determine a third status of the resistance factor as one of (a) within a limit and (b) outside the limit, and (A) responsive to (2)(a), create the new thread, and (B) responsive to (2)(b), enqueue the work order, and (3) responsive to (i)(b) and responsive to (ii)(c), enqueue the work order to the work queue.

In accordance with a 16th exemplary aspect of the present disclosure, which may be used in combination with any one or more of the preceding aspects (e.g., the 15th aspect), the scheduler is configured to (iv) determine a fourth status of a second thread of a pool of threads as one of (a) available and (b) unavailable, and (1) response to (i)(a) and (iii)(a), determine a fifth status of the second thread as one of (a) idle before the thread and (b) idle after the thread, (2) responsive to (iii)(a)(1), schedule the work order to the second thread, and (3) responsive to (iii)(a)(2), schedule the work order to the thread.

In accordance with a 17th exemplary aspect of the present disclosure, which may be used in combination with any one or more of the preceding aspects (e.g., the 15th aspect), the resistance factor is included in metadata of the work order.

In accordance with an 18th exemplary aspect of the present disclosure, which may be used in combination with any one or more of the preceding aspects (e.g., the 15th aspect), the resistance factor is generated from at least one of a random number generator (RNG), a pseudorandom number generator (PRNG), and a hashing function.

In accordance with a 19th exemplary aspect of the present disclosure, which may be used in combination with any one or more of the preceding aspects (e.g., the 15th aspect), the work queue is an unbounded work queue.

In accordance with a 20th exemplary aspect of the present disclosure, which may be used in combination with any one or more of the preceding aspects (e.g., the 15th aspect), the work queue is a bounded work queue.

Aspects of the subject matter described herein may be useful alone or in combination with one or more other aspects described herein. In a 21st exemplary aspect of the present disclosure a method includes classifying a thread of a pool of threads as a first classification as one of available and unavailable. Additionally, the method includes classifying the pool of threads as a second classification as one of less than a configured core thread pool size, larger than the configured core thread pool size but less than a maximum core thread pool size, and equal to or larger than the maximum core thread pool size. The method also includes classifying a resistance factor as a third classification as one of within a limit and outside the limit, classifying the thread of the pool of threads as a fourth classification as one of most recently idle and available and unavailable; and adding a work order to one of a thread or a work queue based on at least one of the first, second, and third classifications.

In accordance with a 22nd exemplary aspect of the present disclosure, which may be used in combination with any one or more of the preceding aspects (e.g., the 21st aspect), the method further includes generating the resistance factor.

In accordance with a 23rd exemplary aspect of the present disclosure, which may be used in combination with any one or more of the preceding aspects (e.g., the 22nd aspect), the method further includes associating the resistance factor with the work order.

In accordance with a 24th exemplary aspect of the present disclosure, which may be used in combination with any one or more of the preceding aspects (e.g., the 22nd aspect), the resistance factor is generated from at least one of a random number generator (RNG), a pseudorandom number generator (PRNG), and a hashing function.

In accordance with a 25th exemplary aspect of the present disclosure, which may be used in combination with any one or more of the preceding aspects (e.g., the 21st aspect), adding the work order is responsive to classifying the thread of the pool of threads as available.

In accordance with a 26th exemplary aspect of the present disclosure, which may be used in combination with any one or more of the preceding aspects (e.g., the 21st aspect), the method further includes responsive to classifying the pool of threads as less than the configured core thread pool size, creating a new thread in the pool of threads.

In accordance with a 27th exemplary aspect of the present disclosure, which may be used in combination with any one or more of the preceding aspects (e.g., the 21st aspect), classifying the resistance factor is responsive to classifying the pool of threads as larger than the configured core thread pool size but less than the maximum core thread pool size.

In accordance with a 28th exemplary aspect of the present disclosure, which may be used in combination with any one or more of the preceding aspects (e.g., the 21st aspect), adding the work order to the work queue is responsive to classifying the pool of threads as equal to or larger than the maximum core thread pool size.

In accordance with a 29th exemplary aspect of the present disclosure, which may be used in combination with any one or more of the preceding aspects (e.g., the 21st aspect), adding the work order to the work queue is responsive to classifying the resistance factor as outside the limit.

In accordance with a 30th exemplary aspect of the present disclosure, which may be used in combination with any one or more of the preceding aspects (e.g., the 21st aspect), the method further includes responsive to classifying the resistance factor as within the limit, adding a new thread.

Aspects of the subject matter described herein may be useful alone or in combination with one or more other aspects described herein. In a 31st exemplary aspect of the present disclosure a method includes (i) determining a status of the thread of the pool of threads as unavailable, and responsive to (i), appending a work order to a work queue. The method also includes (ii) determining a second status of the pool of threads as one of (a) less than a configured core thread pool size, (b) larger than the configured core thread pool size but less than a maximum core thread pool size, and (c) equal to or larger than the maximum core thread pool size. Responsive to (i) and (ii)(a), the method includes creating a new thread for the work order. Responsive to (i) and (ii)(b), the method includes (iii) determining a third status of a resistance factor as one of (a) within a limit and (b) outside the limit. Responsive to (iii)(a), the method includes creating the new thread, and responsive to (iii)(b), adding the work order to the work queue. Responsive to (i) and (ii)(c), the method includes adding the work order to the work queue.

Aspects of the subject matter described herein may be useful alone or in combination with one or more other aspects described herein. In a 32nd exemplary aspect of the present disclosure a system includes a first means for classifying a thread of a pool of threads as a first classification as one of available and unavailable. The system also includes a second means for classifying the pool of threads as a second classification as one of less than a configured core thread pool size, larger than the configured core thread pool size but less than a maximum core thread pool size, and equal to or larger than the maximum core thread pool size. Additionally, the system includes a third means for classifying a resistance factor as a third classification as one of within a limit and outside the limit. The system also includes a means for adding a work order to one of a thread or a work queue based on at least one of the first, second, and third classifications.

Aspects of the subject matter described herein may be useful alone or in combination with one or more other aspects described herein. In a 33rd exemplary aspect of the present disclosure a non-transitory machine-readable medium storing code, which when executed by a processor, is configured to classify a thread of a pool of threads as a first classification as one of available and unavailable, and classify the pool of threads as a second classification as one of less than a configured core thread pool size, larger than the configured core thread pool size but less than a maximum core thread pool size, and equal to or larger than the maximum core thread pool size. The non-transitory machine-readable medium is also configured to classify a resistance factor as a third classification as one of within a limit and outside the limit. Additionally, the non-transitory machine-readable medium is configured to add a work order to one of a thread or a work queue based on at least one of the first, second, and third classifications.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   at least one processor in communication with the memory; and
   a scheduler configured to:
   (i) determine a first status of a thread of a pool of threads as one of (a) available and (b) unavailable, and
      (1) responsive to (i)(a), schedule a work order to the thread, and
      (2) responsive to (i)(b), append the work order to a work queue,
   (ii) determine a second status of the pool of threads as one of (a) less than a configured core thread pool size, (b) larger than the configured core thread pool size but less than a maximum core thread pool size, and (c) equal to or larger than the maximum core thread pool size, and
      (1) responsive to (i)(b) and (ii)(a), create a new thread for the work order, and
      (2) responsive to (i)(b) and (ii)(b), determine a third status of a resistance factor as one of (a) within a limit and (b) outside the limit, and
         (A) responsive to (2)(a), create the new thread, and
         (B) responsive to (2)(b), enqueue the work order, and
      (3) responsive to (i)(b) and responsive to (ii)(c), enqueue the work order to the work queue.

2. The system of claim 1, wherein the resistance factor is generated from at least one of a random number generator (RNG), a pseudorandom number generator (PRNG), and a hashing function.

3. The system of claim 1, wherein the scheduler is configured to schedule a different work order responsive to (i)(a).

4. The system of claim 1, further comprising a counter, wherein the counter is configured to count a quantity of threads in the pool of threads.

5. The system of claim 4, further comprising a second counter configured to count a second quantity of work orders in a work queue.

6. The system of claim 1, wherein the work queue is an unbounded work queue.

7. The system of claim 1, wherein the work queue is a bounded work queue.

8. The system of claim 1, wherein the scheduler is configured to determine whether the thread was more recently made idle than another available thread.

9. The system of claim 1, wherein the scheduler is configured to:
   (iii) determine a fourth status of a second thread of a pool of threads as one of (a) available and (b) unavailable, and
      (1) response to (i)(a) and (iii)(a), determine a fifth status of the second thread as one of (a) idle before the thread and (b) idle after the thread,
      (2) responsive to (iii)(a)(1), schedule the work order to the second thread, and
      (3) responsive to (iii)(a)(2), schedule the work order to the thread.

10. A method implemented on a computing system having at least one processor coupled with memory-stored instructions which, when executed by the processor, perform the method, comprising:
   (i) determining a first status of a thread of a pool of threads as one of (a) available and (b) unavailable; and
      (1) responsive to (i)(a), scheduling a work order to the thread, and
      (2) responsive to (i)(b), appending the work order to a work queue,
   (ii) determining a second status of the pool of threads as one of (a) less than a configured core thread pool size, (b) larger than the configured core thread pool size but less than a maximum core thread pool size, and (c) equal to or larger than the maximum core thread pool size,
      (1) responsive to (i)(b) and (ii)(a), creating a new thread for the work order, and
      (2) responsive to (i)(b) and (ii)(b), determining a third status of a resistance factor as one of (a) within a limit and (b) outside the limit, and
         (A) responsive to (2)(a), creating the new thread, and
         (B) responsive to (2)(b), enqueuing the work order, and
      (3) responsive to (i)(b) and responsive to (ii)(c), enqueue the work order to the work queue.

11. The method of claim 10, further comprising generating the resistance factor.

12. The method of claim 11, further comprising associating the resistance factor with the work order.

13. The method of claim 11, wherein the resistance factor is generated from at least one of a random number generator (RNG), a pseudorandom number generator (PRNG), and a hashing function.

14. The method of claim 10, further comprising scheduling a different work order responsive to (i)(a).

15. The method of claim 10, further comprising counting a quantity of threads in the pool of threads.

16. The method of claim 10, further comprising a second quantity of work orders in a work queue.

17. The method of claim 10, wherein the work queue is an unbounded work queue.

18. The method of claim 10, wherein the work queue is a bounded work queue.

19. The method of claim 10, further comprising determining whether the thread was more recently made idle than another available thread.

20. A non-transitory machine-readable medium storing code, which when executed by a processor is configured to:

(iii) determine a first status of a thread of a pool of threads as one of (a) available and (b) unavailable, and
  (1) responsive to (i)(a), schedule a work order to the thread, and
  (2) responsive to (i)(b), append the work order to a work queue, (iv) determine a second status of the pool of threads as one of (a) less than a configured core thread pool size, (b) larger than the configured core thread pool size but less than a maximum core thread pool size, and (c) equal to or larger than the maximum core thread pool size, and
  (1) responsive to (i)(b) and (ii)(a), create a new thread for the work order, and
  (2) responsive to (i)(b) and (ii)(b), determine a third status of a resistance factor as one of (a) within a limit and (b) outside the limit, and
    (A) responsive to (2)(a), create the new thread, and
    (B) responsive to (2)(b), enqueue the work order, and
  (3) responsive to (i)(b) and responsive to (ii)(c), enqueue the work order to the work queue.

\* \* \* \* \*